United States Patent
Kübler

(10) Patent No.: US 11,283,794 B2
(45) Date of Patent: Mar. 22, 2022

(54) METHOD FOR MONITORING ACTIVITY OF DATABASE SERVER ADMINISTRATOR IN ENTERPRISE RESOURCE PLANNING SYSTEM AND THE TAMPER-PROOF ENTERPRISE RESOURCE PLANNING SYSTEM

(71) Applicant: Michael Kübler, Diez (DE)

(72) Inventor: Michael Kübler, Diez (DE)

(*) Notice: Subject to any disclaimer, the term of this patent is extended or adjusted under 35 U.S.C. 154(b) by 167 days.

(21) Appl. No.: 16/738,989

(22) Filed: Jan. 9, 2020

(65) Prior Publication Data
US 2021/0218735 A1    Jul. 15, 2021

(51) Int. Cl.
*H04L 29/06* (2006.01)
*G06Q 10/06* (2012.01)
*G06F 21/60* (2013.01)
*G06F 21/62* (2013.01)

(52) U.S. Cl.
CPC ........ *H04L 63/0838* (2013.01); *G06F 21/602* (2013.01); *G06F 21/6218* (2013.01); *G06Q 10/06313* (2013.01)

(58) Field of Classification Search
CPC .......... H04L 63/0838; G06Q 10/06313; G06F 21/602; G06F 21/6218; G06F 2221/2101; G06F 21/64
See application file for complete search history.

(56) References Cited

U.S. PATENT DOCUMENTS

| | | | | |
|---|---|---|---|---|
| 8,078,881 | B1* | 12/2011 | Liu ........................ | G06F 21/31 713/183 |
| 10,893,052 | B1* | 1/2021 | Bosworth ............. | H04L 63/083 |
| 2017/0302661 | A1* | 10/2017 | Connell, II ......... | H04L 63/0861 |
| 2019/0095606 | A1* | 3/2019 | Lewis ................. | H04L 63/0884 |

* cited by examiner

*Primary Examiner* — Meng Li
(74) *Attorney, Agent, or Firm* — NZ Carr Law Office PLLC

(57) ABSTRACT

The present invention discloses a tamper-proof ERP (Enterprise Resource Planning) system against a database server administrator, and a Logbook is setup for the database server administrator on the database server level in the ERP system. A reliable Logbook is created for the database server administrator on the database server level outside an ERP Application. Additionally, the Logbook also contains the needed information to restore the SQL database completely. This solution can be realized together with selection of a suitable SQL database server which prevents full unrestricted administrator access by using a two-factor authentication, wherein a first factor is known/selectable by end user only, and a second factor is managed by the ERP Application only.

19 Claims, 10 Drawing Sheets

METHOD FOR MONITORING ACTIVITY OF DATABASE SERVER ADMINISTRATOR IN ENTERPRISE RESOURCE PLANNING SYSTEM AND THE TAMPER-PROOF ENTERPRISE RESOURCE PLANNING SYSTEM

BACKGROUND OF THE INVENTION

Field of the Invention

The present invention relates to a tamper-proof ERP (Enterprise Resource Planning) system against a database server administrator, and more particularly to a Logbook setup for the database server administrator on the database server level in the ERP system.

Description of Conventional Art

ERP systems are using database servers for data storage. These database servers regularly only have measure or logbook for the users and administrators within an ERP application software, but have no monitoring measure or logbook for activities of the database server administrator.

Unfortunately, if implemented via triggers, procedures, etc. in the database server, a server administrator can disable the logbook within the ERP application software or bypass it with an emergency access. These emergency accesses are used by some known database servers as a lost server administrator password recovery feature for multi-user environments, for example MySQL server, MsSQL server, PostgreSQL server, and Firebird server, etc.

Brief Description of Client-Server Mode

As shown in FIG. 1, under the regular client-server mode, the present ERP system comprises: the Application Server with Access/User Management, Data Management and License Management; and the Data Storage/Database Server. The multi users/multi clients are connected to and communicate with both the Application Server and the Database Server through the Network. The Application Server is also connected to and communicates with the Database Server.

In this client-server mode, the software is installed and used in three parts. The installation is carried out via a uniform installation program with appropriate selection options. The Database server is installed with the server part of the software. The Application server includes the control of the database, administrative settings of the software. The Client(s) is for using the ERP software. This Client part can be designed either as locally installed software or as a web server for client access via web browser. Overall, the use of the software is possible as single-user version or multi-user version.

Brief Description of Logging of Users/Administrators

The logging of users/administrators inside the ERP Application will be described in further detail with reference to the accompanying drawings FIG. 2a and FIG. 2b.

As shown in FIG. 2a, the database server administrator tries to directly log, outside an ERP Application, into the database server in the ERP system with the administrator password. With the correct administrator password, the access to SQL database server is granted. If not, the login is refused, or it is allowed to enter another password for some attempts.

After login to the database server, the administrator will possess an unlimited and unrestricted access and rights at SQL database server level. For example, the administrator can stop or interrupt any Logbook System at the database server. As a result, the Log for the administrator activities at the SQL database server will be stopped or interrupted.

Furthermore, FIG. 2a shows the Emergency Access on most existing SQL database servers like MsSQL, MySQL, Postgres, Firebird, etc. As for the particular emergency access, an administrator is able to have emergency access to the SQL database server without requiring any password. Thus, the administrator is allowed to change or reset the administrator password, or to create an additional Administrator account.

As shown in FIG. 2b and in additional to FIG. 2a, an administrator and/or user tries to directly log inside an ERP Application. With the correct password, the access to the ERP Application is granted. A logging function from the ERP Application to the SQL database server is provided. If not, the login is refused, or it is allowed to enter another password for some attempts. It can be understood that the same steps as the corresponding steps in FIG. 2a are not repeated herein.

Furthermore, FIG. 2b shows restoring password for the administrator and/or user. A lost user password can be restored by the ERP Application administrator. A lost administrator password can be restored either by the Database administrator or by a recovery function inside the ERP Application.

After login to the database server, the administrator will still possess an unlimited and unrestricted access and rights at SQL database server level, as shown in both FIG. 2a and FIG. 2b.

Problem to be Solved

As mentioned above, an SQL database server administrator can regularly disable or pause a Logbook due to his/her full unrestricted access to the SQL database server.

Therefore, it is an object of the present invention to prevent that the logging of users and administrators at the ERP Application and at database server level can be disabled by the database server administrator directly on the level of the database server.

SUMMARY OF THE INVENTION

Solution for the Problem

This problem is solved by creating a reliable Logbook for the database server administrator on the database server level outside an ERP Application. Additionally, the Logbook itself also contains the needed information to restore the SQL database completely.

This solution can be realized only together with selection of a suitable SQL database server which prevents full unrestricted administrator access by using a two-factor authentication, wherein a first factor is known/selectable by end user only, and a second factor is managed by the ERP Application only.

The present disclosure provides a method for introducing logbook for monitoring activity of a database server administrator in an Enterprise Resource Planning (ERP) system, the method comprising: logging by the database server administrator with an administrator password; determining whether the administrator password is correct. The method is characterized by further comprising: when the administrator password is incorrect, recovering the administrator password by using a serial Number of the ERP Application or by using an emergency token, and recording the recovery in the logbook at the database server; when the administrator password is correct, accessing to the database server with two-factor authentication, wherein the access to the database server is managed by an ERP application with usage restriction, and the usage restriction comprises that the ERP application does not include disabling the logbook at the database server. The two-factor authentication comprises a first factor which is known and selectable by end users only; and a second factor which is managed by the ERP application only, so as to prevent a direct database access with any vendor or third-party tool.

The second factor is used for decrypting the database. The ERP application with usage restriction allows limited function, and the limited function is recorded in the logbook at the database server. The limited function comprises Database Backup, Database Restoration, Database Test, Creating new Database, Deleting Database or Managing Cluster/Replication.

The method further comprises: logging by an application administrator or user with an application-specific password to the ERP application; connecting login information with two-factor authentication by a login handler, determining whether the application-specific password is correct; and when the application-specific password is correct, accessing to the ERP application.

The database server is configured for Single-User Installation, and the two-factor authentication is determined based on Installation ID, Hardware ID, Serial Number and Salt. The database server is configured for Multi-User Installation, and the two-factor authentication is determined based on Installation ID, Hardware ID, Serial Number, Salt and encrypted Value for the database server. The database server is configured for Multi-User Web Access Installation, and the two-factor authentication is determined based on a temporary One-Time password transmitted by Email.

The database server is the Elevate Database Server or the DBIsam Database Server.

Log files and Backup files are encrypted with a software-specific password in additional to their respective signatures. A serial number of installation is recorded in encryption in the Backup files, and the Log files have the serial number of the installation as one log entry included in Logfile Structure.

The present disclosure provides a computer program product comprising instructions which, when the program is executed by a computer, cause the computer to carry out the steps of any one of the above methods.

The present disclosure provides a recording medium readable by a computer and having recorded thereon a computer program including instructions for executing the steps of any one of the above methods.

BRIEF DESCRIPTION OF DRAWING

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views. The invention itself may be best understood by reference to the following detailed description of the invention, which describes exemplary embodiments of the invention, taken in conjunction with the accompanying drawings, in which.

DETAILED DESCRIPTION OF THE INVENTION

Figure 1:
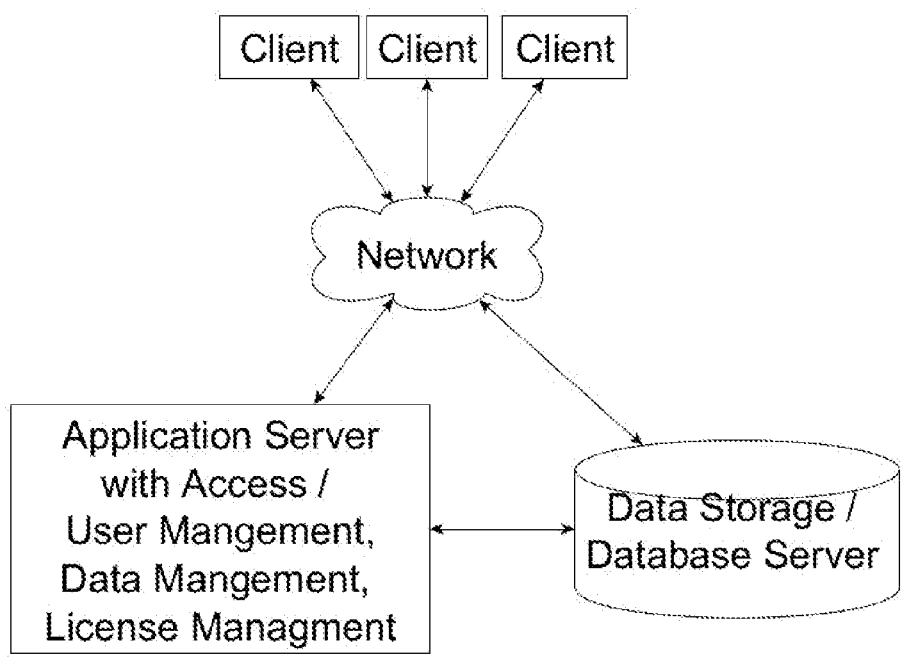
FIG. 1 is a schematic view of an Enterprise Resource Planning system according to the Prior Art.

The present disclosure will be further described in detail below with reference to the drawings and specific embodiments, in order to better understand the objective, the technical solution and the advantage of the present disclosure. It should be understood that the specific embodiments described herein are merely illustrative and are not intended to limit the scope of the disclosure.

Reference will now be made to the drawing figures to describe the present invention in detail.

Figure 3A:
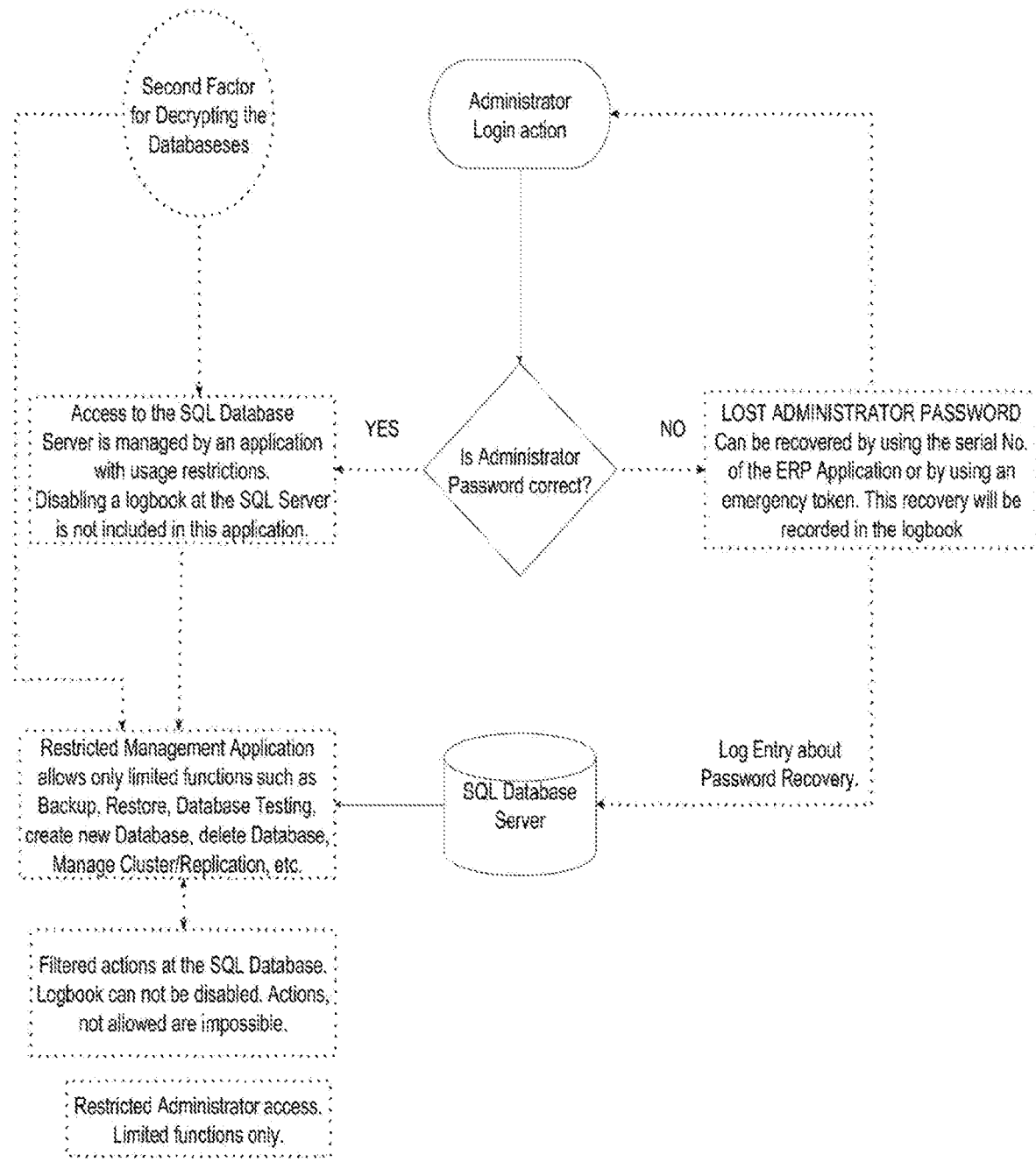
FIG. 3a is a schematic view for the database server administrator logging outside an ERP Application on the database server level with the two-factor authentication according to the present invention.

As shown in FIG. 3a, a logbook is introduced for monitoring activity of a database server administrator in Enterprise Resource Planning (ERP) system. The database server administrator logs in with an administrator password, and it is determined whether the administrator password is correct or not. When the administrator password is incorrect, the administrator password can be recovered by using a serial Number of the ERP Application or by using an emergency token. The recovery is recorded in the logbook at the database server.

When the administrator password is correct, access to the database server is granted with two-factor authentication. The access to the database server is managed by an ERP application with usage restriction, and the usage restriction comprises that the ERP application does not include disabling the logbook at the database server. The two-factor authentication comprises a first factor which is known and selectable by end users only; and a second factor which is managed by the ERP application only, so as to prevent a direct database access with any vendor or third-party tool. The second factor is used for decrypting the database.

The ERP application with usage restriction allows limited function, and the limited function is recorded in the logbook at the database server. The limited function comprises Database Backup, Database Restoration, Database Test, Creating new Database, Deleting Database or Managing Cluster/Replication.

Figure 2A:
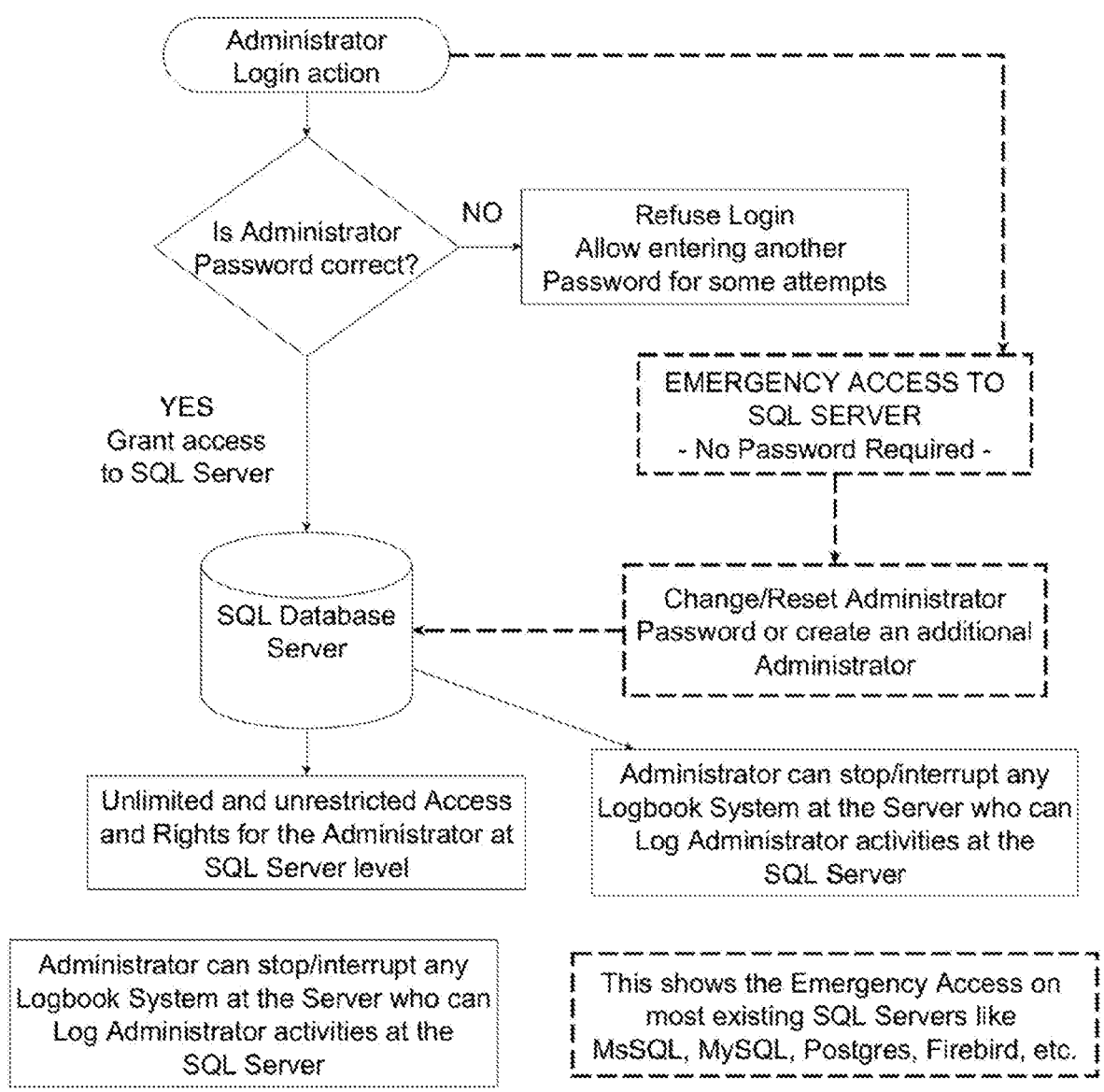
FIG. 2a is a schematic view for the database server administrator logging outside an ERP Application when directly logged to the Database Server in the ERP system according to the Prior Art.
Figure 2B:
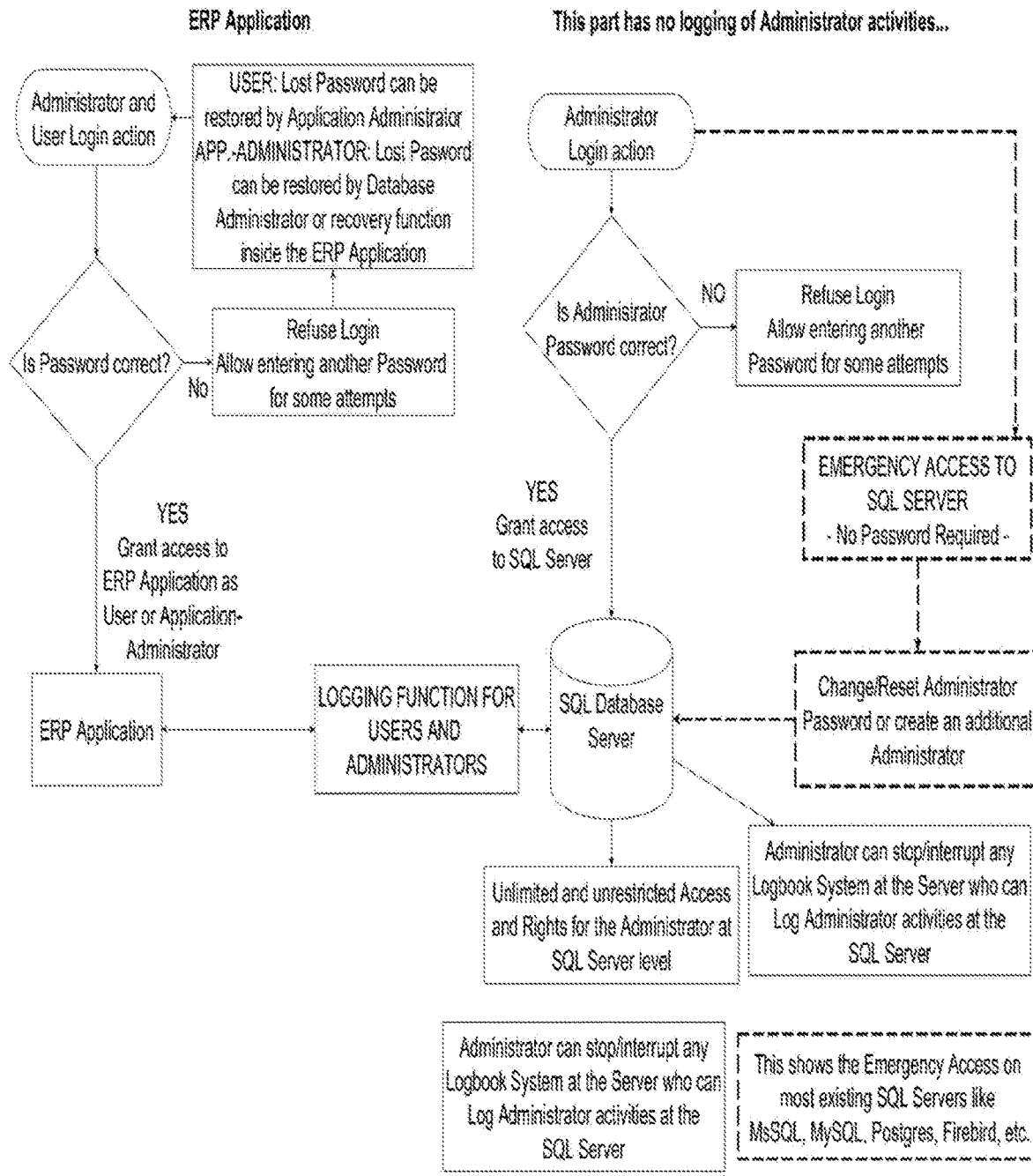
FIG. 2b is a schematic view for both the database server administrator and the application administrator/user logging inside an ERP Application when directly logged to the Database Server in the ERP system according to the Prior Art.
Figure 3B:
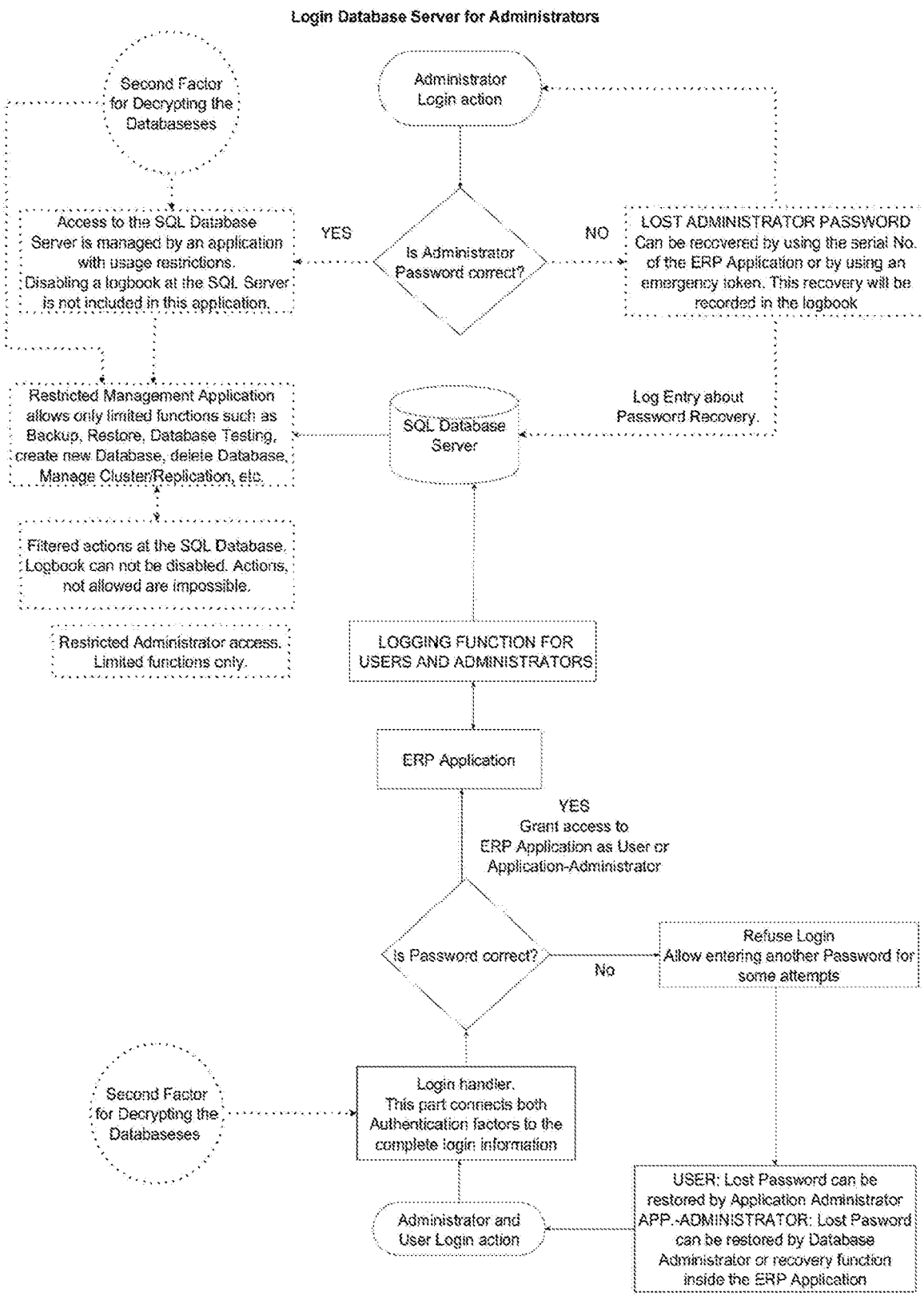
FIG. 3b is a schematic view for both the database server administrator and the application administrator/user logging inside an ERP Application on the database server level with the two-factor authentication according to the present invention.

Further as shown in FIG. 3b, both the database server administrator and the application administrator/user try to log inside an ERP Application on the database server level with the two-factor authentication. It can be understood that the same steps as the corresponding steps in FIG. 2a are not repeated herein.

Particularly, an application administrator or user logs in with an application-specific password to the ERP application. A login handler connects the login information with two-factor authentication. It is determined whether the application-specific password is correct or not. When the application-specific password is correct, access to the ERP application is granted.

Figure 4A:
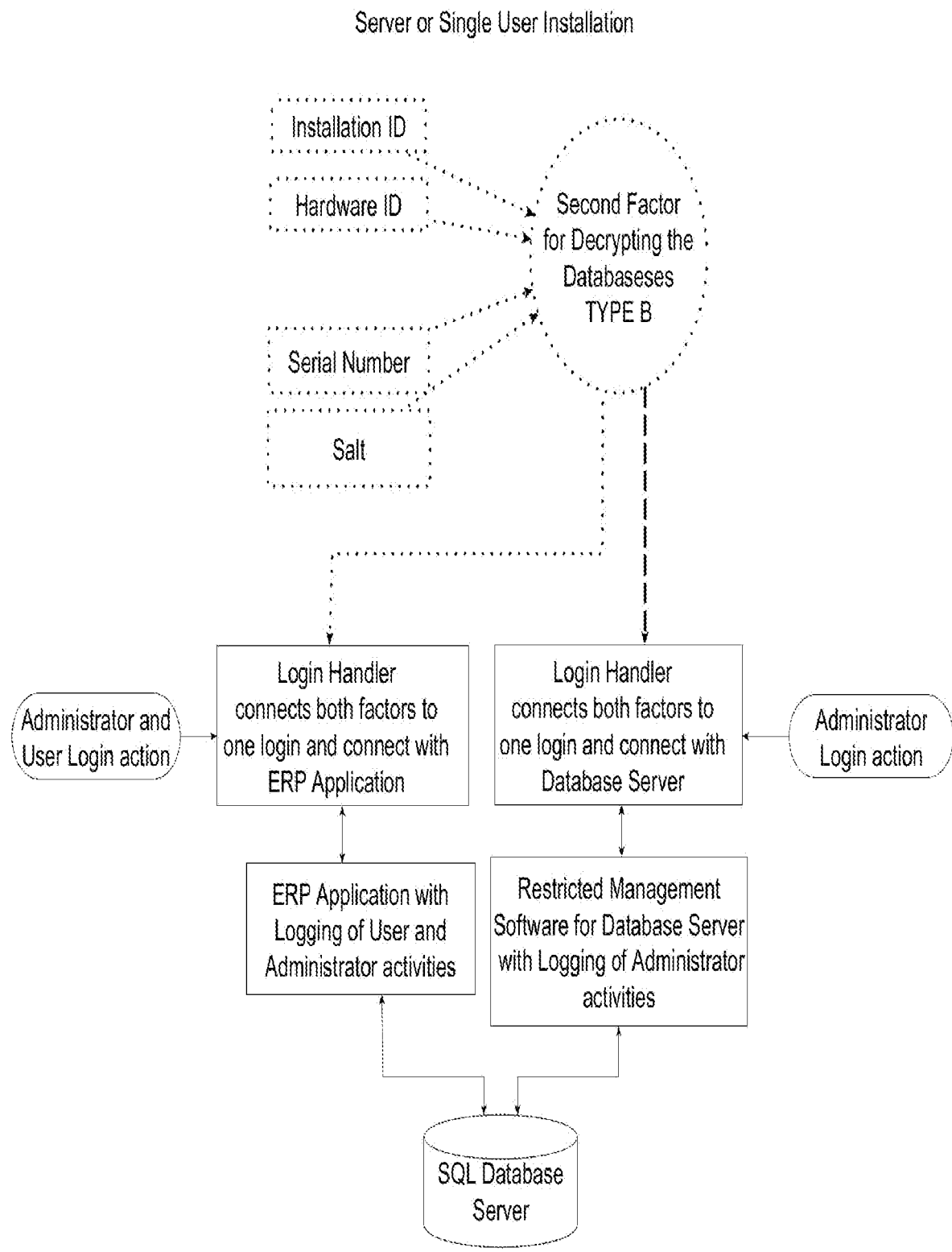
FIG. 4a is a schematic view for Single-User of a Logbook for the database server administrator on the database server level outside an ERP Application.

As shown in FIG. 4a, the database server is configured for Single-User installation, and the two-factor authentication is determined based on Installation ID, Hardware ID, Serial Number and Salt. As for login action of the database server administrator, the Login handler connects both factors to one login and connects with the Database Server. Then the restricted management software provides with logging of administrator activities for the database server. As for login action of the ERP Application administrator and user, the Login handler connects both factors to one login and connects with ERP Application. Then the ERP Application provides with logging of ERP Application administrator activities and user activities.

Figure 4B:
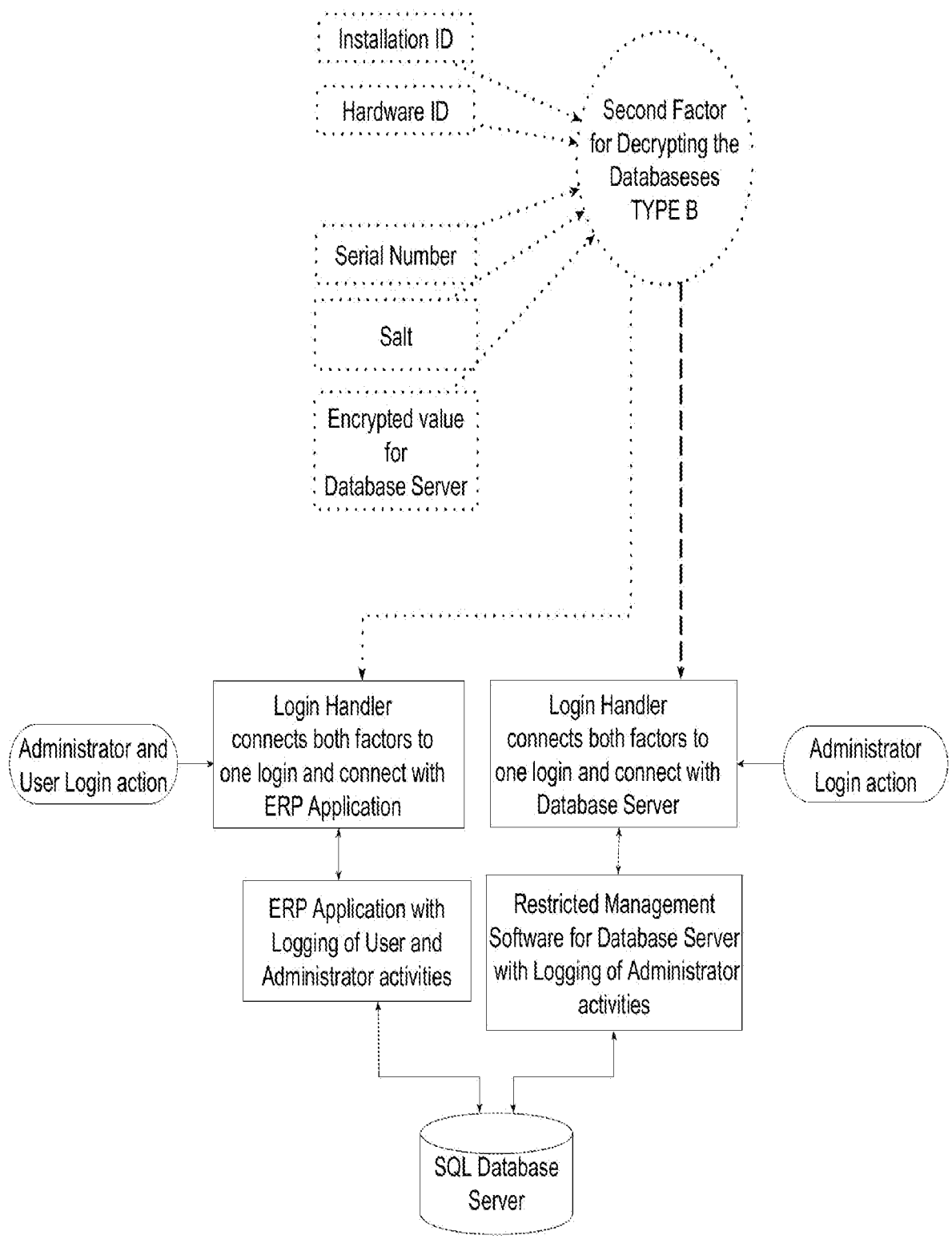
FIG. 4b is a schematic view for Multi-User of a Logbook for the database server administrator on the database server level outside an ERP Application.

As shown in FIG. 4b, the database server is configured for Multi-User installation, and the two-factor authentication is determined based on Installation ID, Hardware ID, Serial Number, Salt and encrypted Value for the database server. It can be understood that the same steps as the corresponding steps in FIG. 4a are not repeated herein.

Figure 4C:
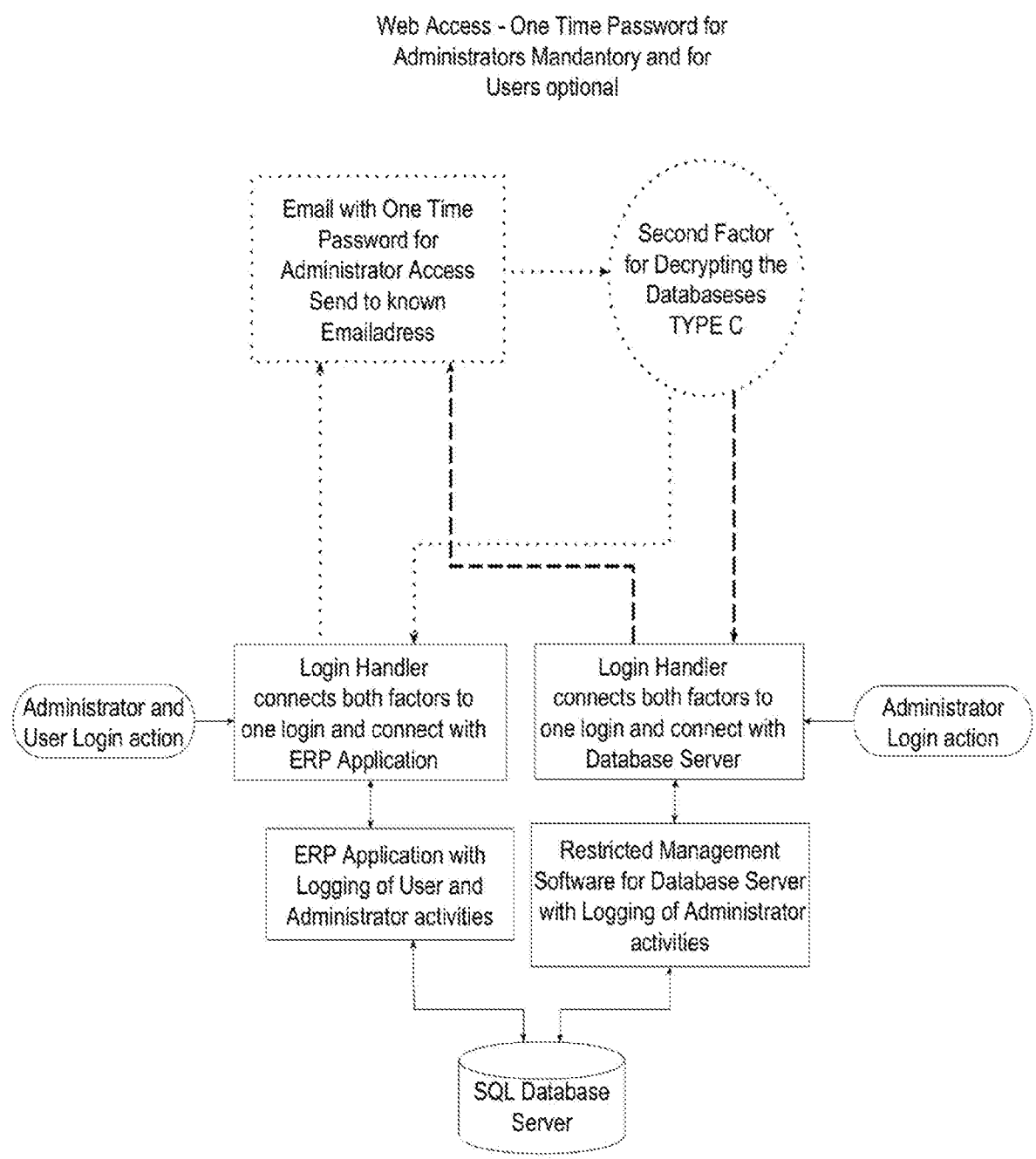
FIG. 4c is a schematic view for Web Access for User and Administrators of a Logbook for the database server administrator on the database server level outside an ERP Application.

As shown in FIG. 4c, the database server is configured for Multi-User Web Access installation, and the two-factor authentication is determined based on a temporary One-Time password transmitted by Email. The Login handler(s) also have access to the Email with the One-Time password. It can be understood that the same steps as the corresponding steps in FIG. 4a or FIG. 4b are not repeated herein.

Description of Two-Factor Authentication/Second Factor Calculation

To ensure that the second factor for the Database Access/SQL Database Server Access is not known by the User/Administrators at the location who is using the ERP Application and not known by the manufacturer of the ERP Application, this second factor is calculated at each start of the software.

Since the second factor is managed by the ERP application only, this prevents a direct database access with any vendor or third-party tool because the second factor(s) is only known by the ERP application.

Mandatory requirement is usage of a SQL Database Server which supports a second factor authentication for Administrative Access at the Database Server. Currently designed for the Database Server is the ElevateDB or DBIsam Database Server.

The two-factor authentication is bound to a specific hardware. This is by design to prevent that even the ERP Manufacturer can access the database server. Also, this causes that the Log files and Backup files need to be encrypted with a software-specific password in addition to their respective signatures. The software-specific password could be a hardware-independent password. Alternatively, the Log files and Backup files are stored in an unencrypted manner, which would escape the scope of the invention because it could open a door for manipulation. Without a hardware independent password, they would be bound to a specific hardware and unreadable/unrecoverable on different hardware.

Figure 5A:
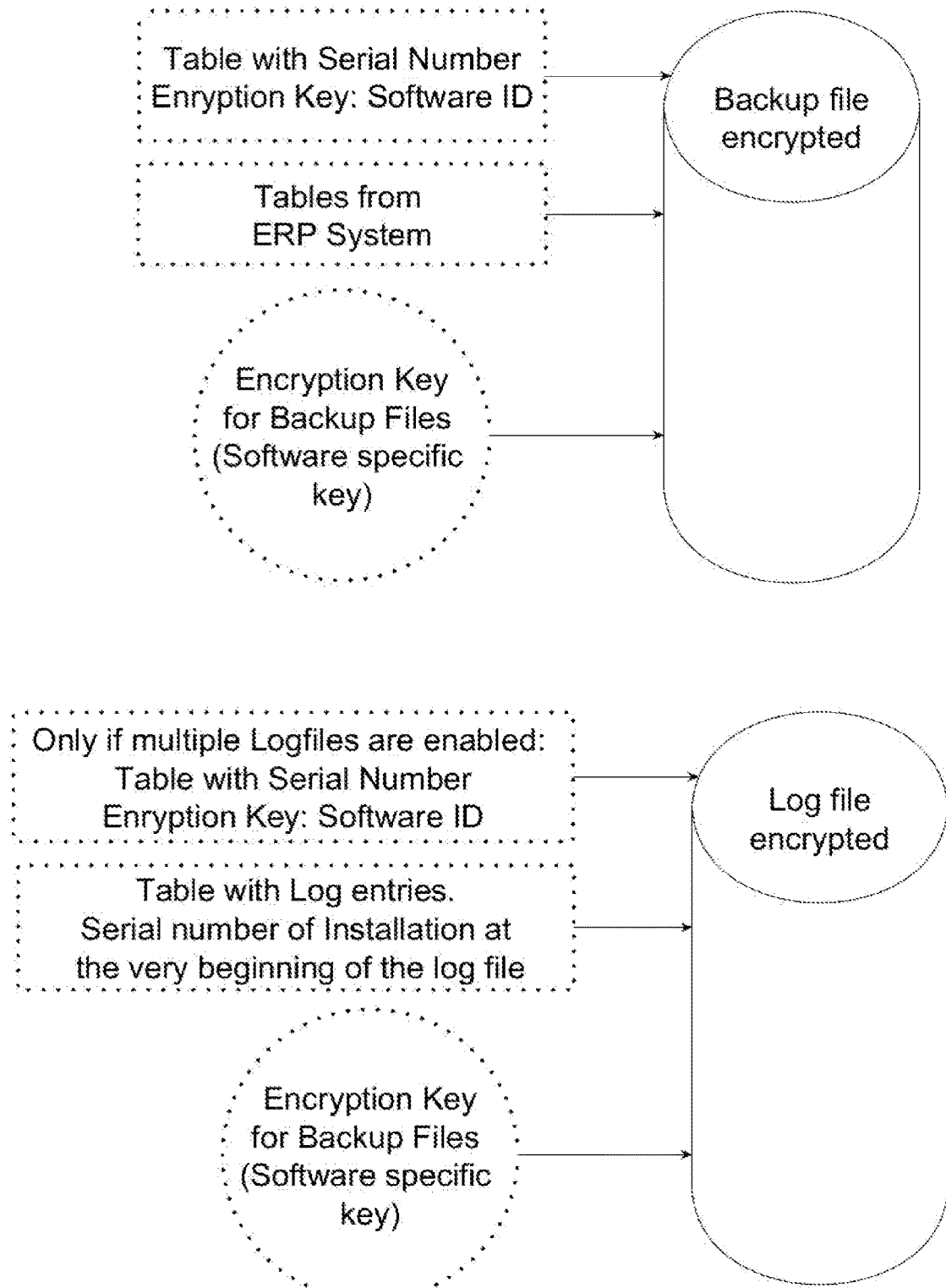
FIG. 5a is a schematic view for structure of the Log files and Backup files in which encryption is based on a software-specific key (password) and the serial number of the installation is recorded for additional check.

In more detail, as shown in FIG. 5a, to keep the Log files and Backup files recoverable on other systems in case of broken hardware, etc., these files are encrypted with a software-specific password in addition to their respective existing signatures. This encryption prevents that a Log files or Backup files can easily unauthorized altered and/or read. As an additional lock, the serial number of the installation is recorded in an encrypted manner in the Backup files. Log files have the serial number of the installation as part of the log entry included in Logfile Structure (see the next section of Description of the Logfile Structure).

Figure 5B:
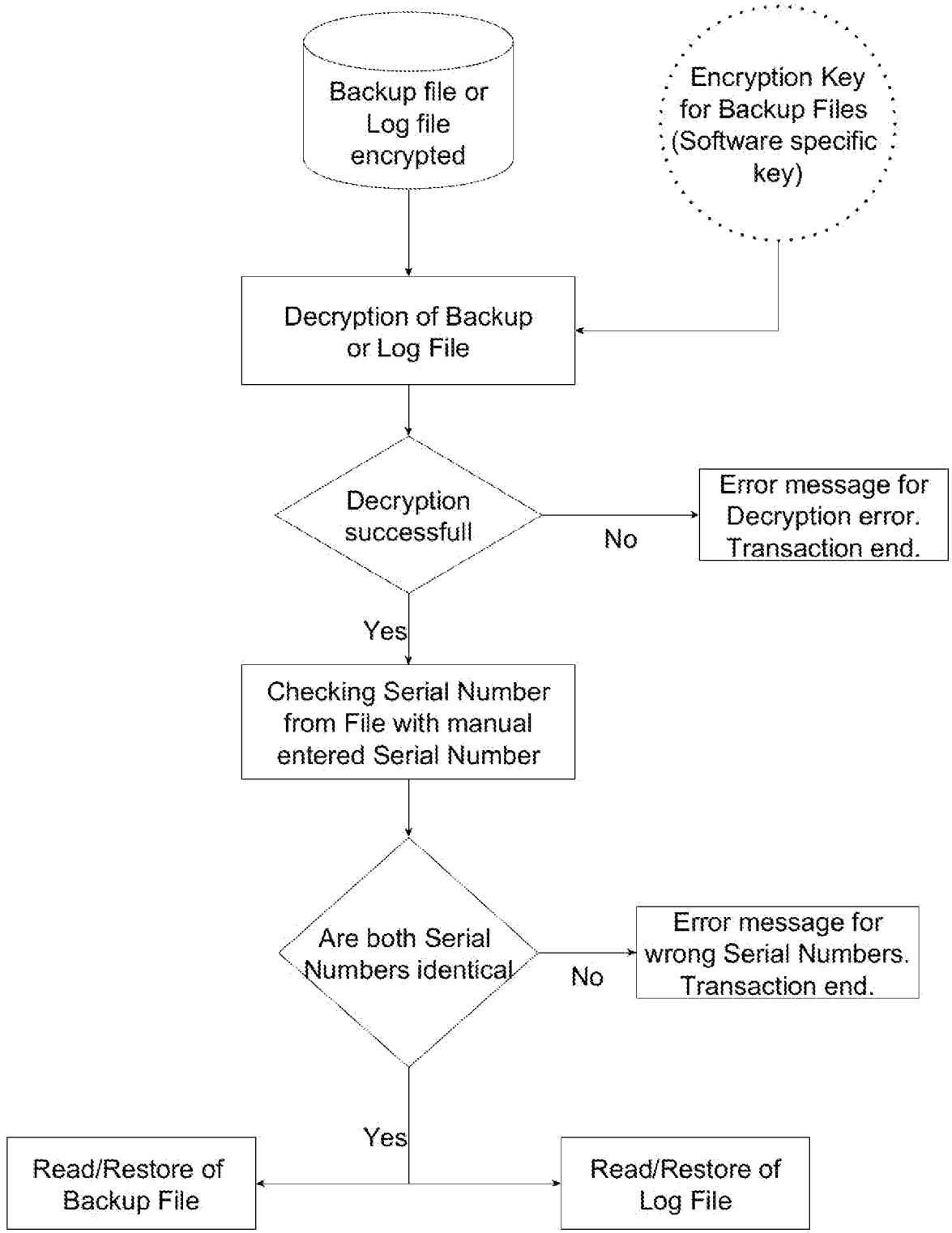
FIG. 5b is a schematic view for reading/restoration of the Log files and Backup files when decryption is based on the software-specific key and the serial number of the installation is checked.

As shown in FIG. 5b, read/restoration would be only possible to the owner of the serial number. Without entering the corresponding serial number in the installed software, an attempt to read/restore will be prevented.

Recommended is, that the Users and Administrators from inside the ERP Application should be connecting to the SQL Database Server with another User who has restricted rights at the SQL Database Server.

The calculation is described as follow:
Second Factor Calculation: Type A
Main Factor calculation.

This calculation is done on Single User installation and at the Database Server location on Multi-User installation. For the client calculation, please refer to Type B. Web access is handled separately.

The second factor calculation is done first at the installation of the Software when the first Database is created on the SQL Database Server or Creation of the local Database.

The following Elements of the hardware and installation are used:

| Element | Description |
| --- | --- |
| (A) Installation ID | Each Windows installation get its own unique Installation UUID. On Linux the System ID is used. |
| (B) Hard Drive ID | Serial Number of a Hard Drive/UUID. Created on each Formation of a Hard Disk Drive. If not available on the selected Operating System, the Hardware Serial Number will be used instead. If no Hard Drive ID is available on the selected Operating System, a USB Stick or USB Hard Drive with a serial Number must be connected for this factor. |

| Element | Description |
| --- | --- |
| | On virtualized System with no native USB Support, the USB Drive must be connected. This Part reflects the Hardware ID and could be exchanged/expanded by any other hardware related ID source. |
| (C) MacID | The MAC ID from all available Network Adaptors will be used, if there is no specific Adaptor selected for usage as Element. This Part reflects the Hardware ID and could be exchanged/expanded by any other hardware related ID source. |
| (D) Serial Number | Serial Number/License Number of the installation. |
| (E) Salt | The salt is created as a combination of two GUIDs. The salt is stored encrypted on the Database Server. Encryption Key is the Serial Number of the installation. |

The elements will be used to generate a SHA-2 Hash or, if technically needed, a SHA 3 Hash Value. This value is the second factor. For ElevateDB this created Hash is used to create a MD5 hash due to technical specification of ElevateDB.
Creation of the Hash Value:
HASH OF ((A)+(B)+(C)+(D)+(E))
Creation MD5 (ElevateDB only): HASH MD5 OF HASH
Example are presented below:

| | |
| --- | --- |
| (A) Installation ID | 01234567-ABCD-ABCD-1234-1234567890AB |
| (B) Hard Drive ID | Windows Hard Drive Serial Number: 0123-ABCD |
| (C) MacID | 01:03:00:F4:A6:EC |
| (D) Serial Number | 12345-67890-12345-67890-12345 |
| (E) Salt | 01234567-ABCD-ABCD-1234-1234567890AB: 01234567-ABCD-ABCD-1234-1234567890AB |

Hash Source:
01234567–ABCD–ABCD–1234–1234567890AB+0123–ABCD+01:03:00:F4:A6:EC+12345–67890–12345–67890–12345+01234567–ABCD–ABCD–1234–1234567890AB:01234567–ABCD–ABCD–1234–1234567890AB
Hash Value (SHA-256)
4e63198cca2f2fa806ece61dda02199220aa95c1e9a3ac23f5b537f4f1b2d6b6
Hash Value MD5 for ElevateDB (Source is the SHA-256 Hash)
b1b4c419ceda2b85606a0ffaf1b2481e
Second Factor Calculation: Type B
Client storage of the second factor. This type of storage is used for Clients in a Multi-User installation.
Because the Clients have no access to the Database Server Hardware and in order to prevent transmission of Hardware Information over Networks, the required Hash Value is stored encrypted at each client.

The encryption key for storing the Hash is calculated each time as described under Type A. This measurement prevents the un-safe situation that the Hash can be easily read out from a client.
The initial transmission of the Hash Value is encrypted. The required transmission decryption key needs to be entered manually at installation and is created as a One-Time-only key.
Second Factor Calculation: Type C
Client storage of the second factor. This type of storage is used for Clients in a Multi-User Web access installation.
Because Web, the Clients can be from all over the world. Thus, it is required to have an additional limited/restricted User Account at the SQL Database Server. If an administrative access should be required to the SQL Database Server, the inhouse Webserver should connect to the Database Server Manager and authenticate the Web-User with the required rights. As second Web-User Identification, a temporary One-Time-only password should transmitted by Email to the registered Email address from the Web-User.
Description of the Logfile Structure
The Log files are designed to be used as an additional recovery source in case of broken database(s); and used as an activity logbook for the user(s), Application administrator(s) and database server administrator(s).
A single Log file contains the serial number of the installation as regular log entry at the very beginning. The last row of a single log file contains the last recorded activity.
Multiple Log files have a header entry with the serial number of the installation. The last row of the table at a splitted Log file contains the information indicating that this log file has been splitted and indicating that further log entries are in another file. It contains a randomized value which will be also in the first row of the next log file, in order to ensure correct usage of the sequence of log files.
The Log file has the restriction that each Log record contains only the handling of one Database Table, in order to ensure the most compatibility for restoring.
For the above purpose, the Logfiles have the following structure:

| Element | Description |
| --- | --- |
| Log Entry No. A | Part A of the Log entry number. An Integer Field in a Database can contain only a limited number of values. This value is SQL Database Server specific. For example, 2.147.483.647. To prevent an overflow of Log Records number, there is a second counter who will be incremented by one when the Log Entry No. A reaches the maximum and restarts at 1. |
| Log Entry No. B | Part B of the Log entry number. |
| Timestamp | Date and time in UTC Format. Time synchronization will be performed when the clients log in to the Database Server. |

| Element | Description |
|---|---|
| Station ID | Station ID where the Log Record has been created. The Station ID can be set up in the ERP Application or will be the System Name. |
| User ID | User ID who has created the Log Record. |
| Action | Action performed with this Log Record. Possible values could be:<br>Add Record<br>Add Table<br>Add Database<br>Delete Database<br>Delete Record<br>Change Record<br>Backup<br>Restore<br>Check<br>Repair<br>Update<br>Change user<br>Add user<br>Delete user<br>Etc. |
| Hash Value old Record | If a new entry/record is not created, the hash value of the old entry/record, which will be changed, is recorded here to ensure that the right entry/record will be changed. When a Software Update should be done, the Hash value will be used to check that the right file will be changed. |
| Hash Value new Record | The Hash value after performing the SQL Statement. When a Software Update has been done, the Hash value will be used to check that the record has been changed correctly. |
| Record No. changed/added | The record number which has been altered in the table. Because a deletion can add the Marker "Deleted" to a record, a delete is also only an alternation. If a delete is really performed, the Record ID which is removed from the Database will be indicated here. |
| Table or Database name | The table or database which will be effected by the SQL Statement. |
| Marker: Update | This marker shows if the SQL Statement contains an Update of the Database Structure. In this case the value for old Record will be ignored. |
| Marker: Repair | This marker shows if the SQL Statement contains a repair action of the Database. In this case, the value for old Record will be ignored if indicated. Possible values could be:<br>None<br>Repair with Hash Recognition<br>Repair without Hash Recognition. |
| SQL Statement | The SQL Statement is stored as Base64 value. This prevents that SQL Statements are accidently handled by the SQL Database Server.<br>Other contents are also stored as Base64 value to ensure highest compatibility with various systems. |
| Hash SQL Statement | The SQL Statement will be checked against alternation with a Hash value. |
| Hash value of Log Record | Hash value of the complete Log Record. This hash will be salted with the Serial number/License Number of the installation to prevent that the Log files from a different installation will be accepted.<br>If an Update, Repair or Software update should be performed, the hash value will be salted with Version number of the Database (Any Update of the Software or Database Structure will change the Version number of the Database. This ensures that only the correct version will be updated). |
| Hash value previous Log Record | The Hash Value of the previous Log Record will be used to ensure to use the right order of Log Records. |

Description of the Backup File Structure

The Backup File—or Backup files if the backup will be divided into different files —contains the tables of the ERP Software expanded with a column for a hash signature to ensure proper transmission and an additional table with information to ensure a correct reading/recovery.

The additional table contains the following information:

| Element | Description |
|---|---|
| Software Version incl. Patch Level/Sub Version | To check if the right software and Software version are used for recovery; these information contain the minimum required Software and Version. |

| Element | Description |
| --- | --- |
| Serial Number | The serial number of the installation where the backup has been created. This serial number must be used for the new installation or a recovery will not be performed. This helps to prevent the unauthorized recovery of a backup. |
| Date and time of Backup Start | Date and time of Backup Start. Transaction after this start point are not included in the backup. |
| File counter | For multiple backup files, this counter ensures the correct usage of the file sequence. |
| Last file/single file | This indicates on multiple files that the last backup file has been reached. On a single file, this marks that only one backup file is existing. |
| Date and time of Backup End | Date and Time of Backup end shows that the backup has been fully performed without errors. |
| Hash Signature | Hash signature of the values in this table. |

The salt for all Hashes is the Software Version.

While the disclosure has been described by way of example and in terms of exemplary embodiment, it is to be understood that the disclosures is not limited thereto. It is to be understood that the above-described embodiments are merely illustrative and not restrictive. To the contrary, it is intended to lamp shade various modifications and similar arrangements (as would be apparent to those skilled in the art).

It will be readily understood by those skilled in the art that the above various preferred embodiments can be freely combined and superimposed without conflict. Various obvious or equivalent modifications or alterations to the above-described details will be included in the scope of the claims of the present disclosure without departing from the basic principles of the application. Therefore, the scope of the appended claims should be accorded the broadest interpretation so as to encompass all such modifications and similar arrangements.

What is claimed is:

1. A method for introducing logbook for monitoring activity of a database server administrator in an Enterprise Resource Planning (ERP) system, said method comprising:
    logging by the database server administrator with an administrator password;
    determining whether the administrator password is correct;
said method is characterized by further comprising:
    when the administrator password is incorrect, recovering the administrator password by using a serial Number of the ERP Application or by using an emergency token, and recording the recovery in the logbook at the database server; and
    when the administrator password is correct, accessing to the database server with two-factor authentication, wherein the access to the database server is managed by an ERP application with usage restriction, and said usage restriction comprises that the ERP application does not include disabling the logbook at the database server;
wherein said two-factor authentication comprises:
    a first factor which is known and selectable by end users only; and
    a second factor which is managed by the ERP application only, so as to prevent a direct database access with any vendor or third-party tool.

2. The method in claim 1, wherein the second factor is used for decrypting the database.

3. The method in claim 1, wherein the ERP application with usage restriction allows limited function, and said limited function is recorded in the logbook at the database server.

4. The method in claim 3, wherein the limited function comprises one of Database Backup, Database Restoration, Database Test, Creating new Database, Deleting Database and Managing Cluster/Replication.

5. The method in claim 1, wherein said method further comprising:
    logging by an application administrator or user with an application-specific password to the ERP application;
    connecting login information with two-factor authentication by a login handler;
    determining whether the application-specific password is correct; and
    when the application-specific password is correct, accessing to the ERP application.

6. The method in claim 5, wherein the database server is configured for Single-User Installation, and the two-factor authentication is determined based on Installation ID, Hardware ID, Serial Number and Salt.

7. The method in claim 5, wherein the database server is configured for Multi-User Installation, and the two-factor authentication is determined based on Installation ID, Hardware ID, Serial Number, Salt and encrypted Value for the database server.

8. The method in claim 5, wherein the database server is configured for Multi-User Web Access Installation, and the two-factor authentication is determined based on a temporary One-Time password transmitted by Email.

9. The method in claim 5, wherein the database server is one of the Elevate Database Server and the DBIsam Database Server.

10. The method in claim 5, wherein the logbook is contained in Log files, and Log files and Backup files are encrypted with a software-specific password in additional to their respective signatures.

11. The method in claim 10, wherein a serial number of installation is recorded in encryption in the Backup files, and the Log files have the serial number of the installation as one log entry included in Logfile Structure.

12. The method in claim 1, wherein the database server is configured for Single-User Installation, and the two-factor authentication is determined based on Installation ID, Hardware ID, Serial Number and Salt.

13. The method in claim 1, wherein the database server is configured for Multi-User Installation, and the two-factor authentication is determined based on Installation ID, Hardware ID, Serial Number, Salt and encrypted Value for the database server.

14. The method in claim 1, wherein the database server is configured for Multi-User Web Access Installation, and the two-factor authentication is determined based on a temporary One-Time password transmitted by Email.

15. The method in claim 1, wherein the database server is one of the Elevate Database Server and the DBIsam Database Server.

16. The method in claim 1, wherein the logbook is contained in Log files, and Log files and Backup files are encrypted with a software-specific password in additional to their respective signatures.

17. The method in claim 16, wherein a serial number of installation is recorded in encryption in the Backup files, and the Log files have the serial number of the installation as one log entry included in Logfile Structure.

18. A non-transitory computer readable medium comprising instructions which, when executed by a computer, cause the computer to carry out steps of a method for introducing logbook for monitoring activity of a database server administrator in an Enterprise Resource Planning (ERP) system, said method comprising:
 logging by the database server administrator with an administrator password;
 determining whether the administrator password is correct;
said method is characterized by further comprising:
 when the administrator password is incorrect, recovering the administrator password by using a serial Number of the ERP Application or by using an emergency token, and
 recording the recovery in the logbook at the database server; and
 when the administrator password is correct, accessing to the database server with two-factor authentication, wherein the access to the database server is managed by an ERP application with usage restriction, and said usage restriction comprises that the ERP application does not include disabling the logbook at the database server;
wherein said two-factor authentication comprises:
 a first factor which is known and selectable by end users only; and
 a second factor which is managed by the ERP application only, so as to prevent a direct database access with any vendor or third-party tool.

19. A non-transitory computer readable medium comprising instructions which, when executed by a computer, cause the computer to carry out steps of a method for introducing logbook for monitoring activity of a database server administrator in an Enterprise Resource Planning (ERP) system, said method comprising:
 logging by the database server administrator with an administrator password;
 determining whether the administrator password is correct;
said method is characterized by further comprising:
 when the administrator password is incorrect, recovering the administrator password by using a serial Number of the ERP Application or by using an emergency token, and
 recording the recovery in the logbook at the database server; and
 when the administrator password is correct, accessing to the database server with two-factor authentication, wherein the access to the database server is managed by an ERP application with usage restriction, and said usage restriction comprises that the ERP application does not include disabling the logbook at the database server;
wherein said two-factor authentication comprises:
 a first factor which is known and selectable by end users only;
 a second factor which is managed by the ERP application only, so as to prevent a direct database access with any vendor or third-party tool;
 logging by an application administrator or user with an application-specific password to the ERP application;
 connecting login information with two-factor authentication by a login handler;
 determining whether the application-specific password is correct; and
when the application-specific password is correct, accessing to the ERP application.

\* \* \* \* \*